US005711715A

United States Patent [19]

Ringo et al.

[11] Patent Number: 5,711,715

[45] Date of Patent: Jan. 27, 1998

[54] METHOD AND APPARATUS FOR TOURNAMENT PLAY OF COIN OPERATED GAMES

[76] Inventors: Dock E. Ringo, 205 NE. First Ave., Mineral Wells, Tex. 76067; James Henry Pearson, 5263 Beasley Bend Rd., Lebanon, Tenn. 37087

[21] Appl. No.: 555,218

[22] Filed: Nov. 8, 1995

Related U.S. Application Data

[63] Continuation-in-part of Ser. No. 540,667, Oct. 11, 1995, abandoned.

[51] Int. Cl.[6] .............................. G06F 15/44; A63F 9/22

[52] U.S. Cl. .............................. 473/9; 473/25; 473/23; 273/293; 273/432

[58] Field of Search .............................. 463/1–9, 23, 25–31, 463/36, 40–42; 273/440–446, 460, 293, 432; 364/410, 411, 412; 434/129

[56] References Cited

U.S. PATENT DOCUMENTS

| | | | |
|---|---|---|---|
| 3,876,208 | 4/1975 | Wachtler et al. | 273/138 |
| 4,569,526 | 2/1986 | Hamilton | 273/242 |
| 4,648,604 | 3/1987 | Horan | 273/292 |
| 4,842,275 | 6/1989 | Tsatskin | 273/440 |
| 4,858,930 | 8/1989 | Sato | 463/23 |
| 5,042,818 | 8/1991 | Wreingarot | 273/292 |
| 5,083,271 | 1/1992 | Thacher et al. | 463/42 |
| 5,114,155 | 5/1992 | Tillery et al. | 463/42 |
| 5,359,510 | 10/1994 | Sabaliauskas | 364/410 |
| 5,558,339 | 9/1996 | Perlman | 463/42 |

OTHER PUBLICATIONS

Bicycle Card Games v. 2.42, SWFTE International Ltd, by Wesley Steiner, Jan. 1995.

Solitaire Game in Microsoft Windows for Work groups, version 3.1 Microsoft copyright 1985–1993, developed by Wes Cherry, 4 pp.

*Primary Examiner*—Jessica Harrison
*Assistant Examiner*—Mark A. Sager
*Attorney, Agent, or Firm*—John F. Bryan

[57] ABSTRACT

A coin operated game playing machine is operated by a microprocessor so as to permit tournament play among a number of players. Names of top ranking players are displayed and a portion of the playing receipts is allocated to an award fund for distribution to the tournament winners as determined by numerical scoring.

7 Claims, 4 Drawing Sheets

METHOD AND APPARATUS FOR TOURNAMENT PLAY OF COIN OPERATED GAMES

This application is a continuation in part of prior application Ser. No. 08/540,667, filed Oct. 11, 1995 now abandoned.

FIELD OF THE INVENTION

The present invention relates generally to the field of games and particularly to such games where numerical scoring provides a basis for competition among players.

BACKGROUND AND SUMMARY OF THE INVENTION

A wide variety of numerically scored video games are commonly played in commercial entertainment settings such as arcades and lounges. The games include card favorites such as solitaire, poker and blackjack as well as a great number of sports games such as bowling and baseball and other types of action games. It is only natural that competition should arise between skilled players. In order to stir these competitive juices, high levels of game difficulty have been introduced, sometimes accompanied by jackpot-like payoffs to the rare player who overcomes great odds.

On occasion, an arcade operator will post the top scores for a game in an effort to encourage game activity. Such competition has heretofore been subject to the discretion and diligence of individual arcade operators. If considered at all, monetary awards have been allocated arbitrarily rather than being optimized for best game yield.

An object of the present invention therefore, is to provide method and apparatus for conducting controlled tournament play of arcade-type games. A second object is to create recognition for contenders and foster competition so as to increase game activity and a third object is to provide for an optimized payout of playing revenues in awards to winners and maximize game yield.

the present invention achieves these objectives through the creation of game information and tournament award account files which may reside in a single game machine or may be shared by a plurality of machines in a network. Each game score is compared to previously recorded high scores so that top ranking scores and players names are recorded and displayed. The challenge of surpassing the posted scores and/or the incentive of winning an award, serves to attract more players. A confidential personal identification code is also entered so that, when the tournament is over, only verifiable winners can claim an award. The awards are allocated as a preset percentage of playing revenues, which may be adjusted so as to maximize yield in a trade off between increasing total playing revenue vs. yield per tournament.

DESCRIPTION OF THE DRAWINGS

The aforementioned and other objects and features of the invention will be apparent from the following detailed description of specific embodiments thereof, when read in conjunction with the accompanying drawings, in which.

DETAILED DESCRIPTION OF THE DRAWINGS

Figure 1:
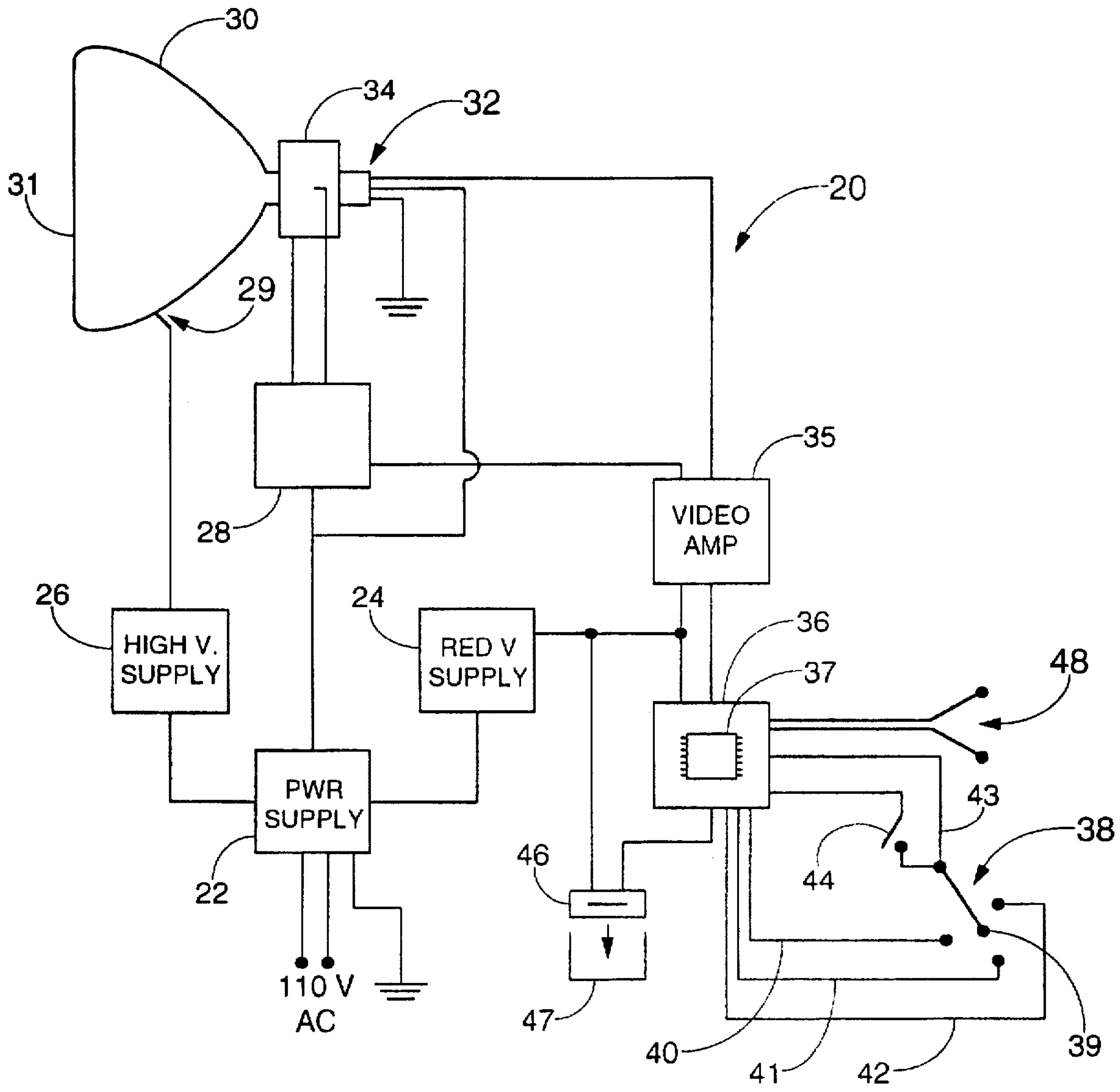
FIG. 1 shows a block diagram of a coin operated game machine for use with a preferred embodiment of the present invention.

FIG. 1 shows a schematic block diagram of one type of coin operated game machine 20, which is capable of utilizing the present invention. In accordance with known prior art, power supply 22 is connected to a conventional 110 VAC line and supplies power to reduced voltage supply 24, high voltage supply 26 and beam deflection system 28. Video display tube 30 is connected to high voltage supply 36 at connection 29 and also to power supply 22 so as to emit an electron beam at base 32. Deflection system 28 is connected to deflection yoke 34 so as to sweep this electron beam across screen 31 in a regular, rapidly repeating raster pattern. Microprocessor 36, with non-volatile memory 37, is programmed to conduct a player-active video game. The game credits deposited in credit slot 46 are retained in box 47 and a preset percentage of these receipts is added to a tournament award account maintained in microprocessor 36. Receipt of the required credits in the form of currency or a token at credit slot 46 sends a signal to microprocessor 36 for starting a game or a game series, depending upon the tournament scoring system. The type of game played is not critical to the present invention so long as it includes a sequence of actions or events which are subject to numerical scoring on the programmed game data is transmitted by microprocessor 36, through amplifier 35, and a modulated electron beam sweeping screen 31 creates the field of play on display screen 31. Play is conducted by ball, joystick or other manual input 39 of planar controller 38, which maneuvers a cursor in display screen 31. The cursor is moved by directional signals from control lines 40, 41 & 42 and their selective connection to controller power line 43. Controller 38 also includes switch 44, for sending command signals which, in conjunction with the directional signals, command game actions. Network connection 48 may be provided to permit sharing of tournament score and award information among a plurality of like machines, so that a greater number players may participate.

Figure 2:
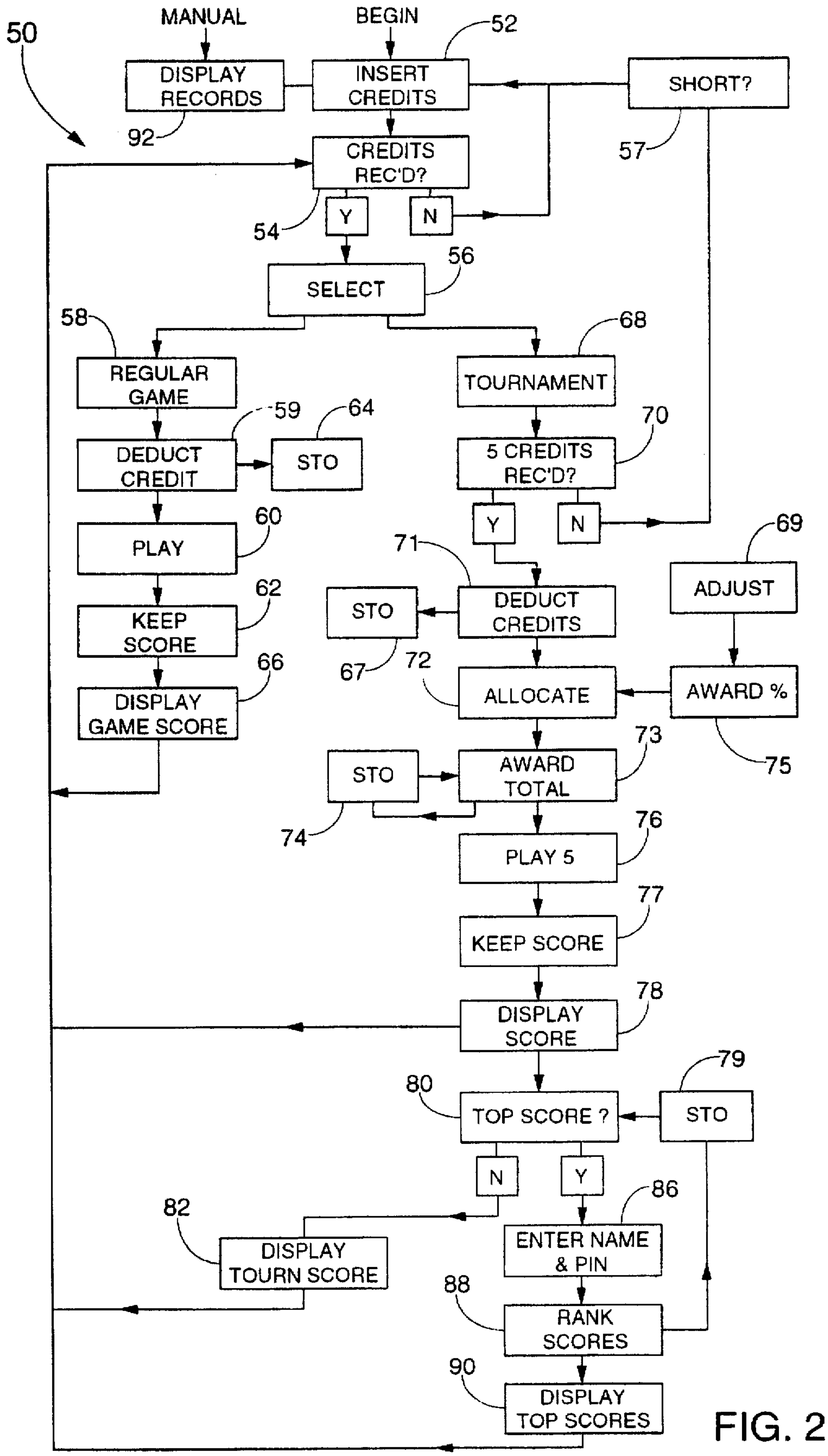
FIG. 2 shows the logic diagram of a preferred embodiment of the present invention for tournament play.

FIG. 2 shows computer logic diagram 50 for a preferred embodiment of the present invention for a general case wherein sets of a given number of games are played for a tournament score and the games are scored on both successful completions and speed. In this example, five game sets are played, but more or fewer may be required. As an alternative, unranked games may be played in the normal manner, without tournament entry. The player deposits a prescribed playing fee, which may be coins, bills or tokens, at "INSERT CREDITS" 52 and, when "CREDITS RECEIVED" 54 shows a positive result, the player is prompted to select either "REGULAR GAME" 58 or "TOURNAMENT GAME" 68 at "SELECT PLAY" 56.

If a non-tournament game is selected, payment is accepted at "DEDUCT CREDIT" 59 and game count is revised and stored at "STO" 64. The game is conducted and scored in the usual manner through "PLAY" 60 and "KEEP SCORE" 62. The scores for successful completions and time bonuses are recorded, calculated and added. The player's score may be shown in a running display during the game if so desired, but in any case, is shown at "DISPLAY SCORE" 66, when the game ends. The score is then shown along with those of the tournament high scores and leaders names at "DISPLAY SCORE" 90, until the next game begins.

When tournament play is selected, a higher game charge may be exacted or a multiple game set may be required. Either way, it will tend to provide larger and more attractive awards. Multiple games may be more desirable for short duration type games, or if a high degree of chance is perceived, while a higher per-game cost may be more appropriate with longer lasting, skill intensive games. This preferred embodiment accommodates a set of multiple games (five) for tournament play at $0.25 per game, but obviously could be adapted to a higher per-game cost or to one or any other number of games/set. After selection of "TOURNAMENT" 68, the number of credits received is verified at "5 CREDITS RECEIVED?" 70 before deduction of the requisite charge for five game set tournament play at "DEDUCT CREDITS" 71. If insufficient credits are on deposit, the computer program goes to "SHORT?" 57 to calculate and display the shortage as the program loops back to "INSERT CREDITS" 52. Otherwise, credits for the tournament set are received at "DEDUCT CREDITS" 71 and the tournament count in "STO" 67 is increased by one. The incremental adjustment for the award account is calculated at "ALLOCATE" 72 where the designated percentage of payments for tournament play at "AWARD %" 75 is applied. This award account increment is added to the account total registered in "STO" 74 at "AWARD TOTAL" 73 and tournament play starts at "PLAY 5" 76. The five game set is played in sequence according to the conventional game format, accumulating score for successful completions and playing time for the five game series at "KEEP SCORE" 77. The player's score may be shown in a running display during each game if desired, but in any case, is shown at "DISPLAY SCORE" 78, when the game is finished. "STO" 79 is recalled to bring the previous three highest scores for comparison with the current score at "TOP SCORE?" 80. If the instant score does not place in the top three, it is displayed on the screen separate from the leaders at "SCORE DISPLAY" 82 as the program loops back for the next game. If the score is within the top three, an alphanumeric form is displayed so that the player can enter his or her name and a confidential, three or four digit, Personal Identification Number (PIN) as prompted at "ENTER NAME & PIN" 86. The scores are reordered at "RANK HIGH SCORES" 88 and stored at "STO" 79. "SCORE DISPLAY" 90 then displays the new tournament "leader board" and this display remains in place as the program returns for another round.

A count has been added to the number of games played at "STO" 64 and, in a similar manner, a count has been added to the number of tournaments played at "STO" 67. These counts are readily converted back into revenue figures. The data stored in storage registers "STO" 64, "STO" 67, "STO" 74 AND "STO" 79 can only be displayed by opening the game machine case and pushing an unobvious button or inserting a key in a locked switch. This secured access maintains confidentiality as to the number of games played and total game revenue, the number of tournaments played and total tournament revenue, the current status of the award account and Personal Identification Numbers as needed for validation of award claimants.

A comparison of the activity information to earlier records allows an operator to adjust "AWARD %" 75 at INPUT 69 in order to optimize machine revenues. Microprocessor 36 may be programmed to implement this adjustment, in the same "cut and try" manner as followed by the operator.

Figure 3:
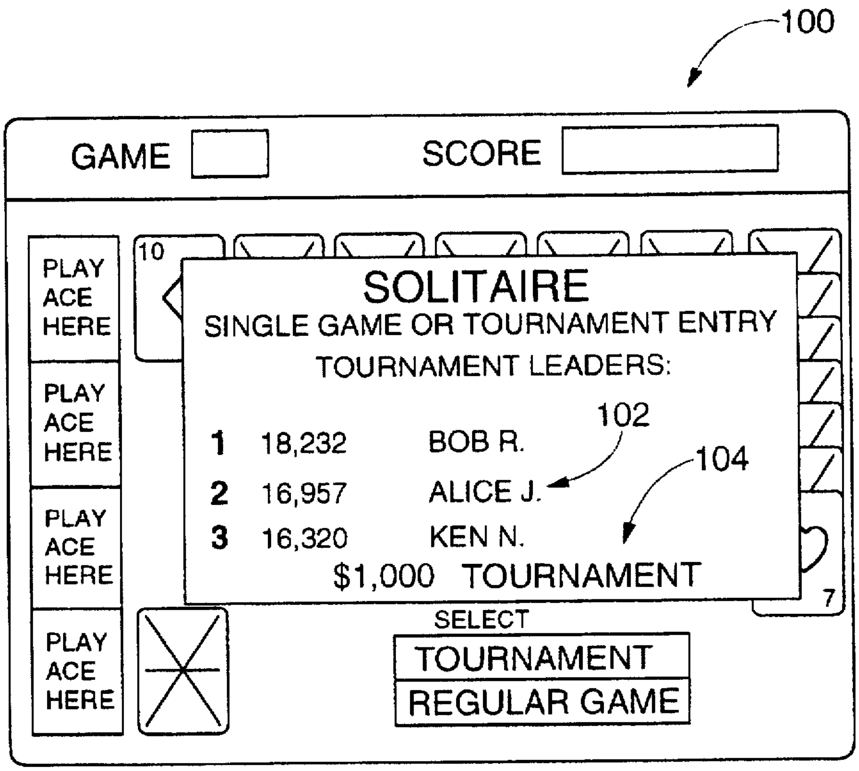
FIG. 3 shows an initial display screen of a typical coin operated game machine using the preferred embodiment of the present invention.

FIG. 3 shows screen display 100 of a video game machine using the preferred embodiment of the present invention with a game program for playing solitaire, a game selected to show the general applicability of the present invention. Display 100 appears in the inactive mode between games and shows the scores of the three tournament leaders 102. In this case, the tournament purse 104 has been designated to be $1,000.00, so the tournament will continue until the "STO" 74 award account reaches that amount. Another tournament scenario might be calendar based, running through a given date.

Figure 4:
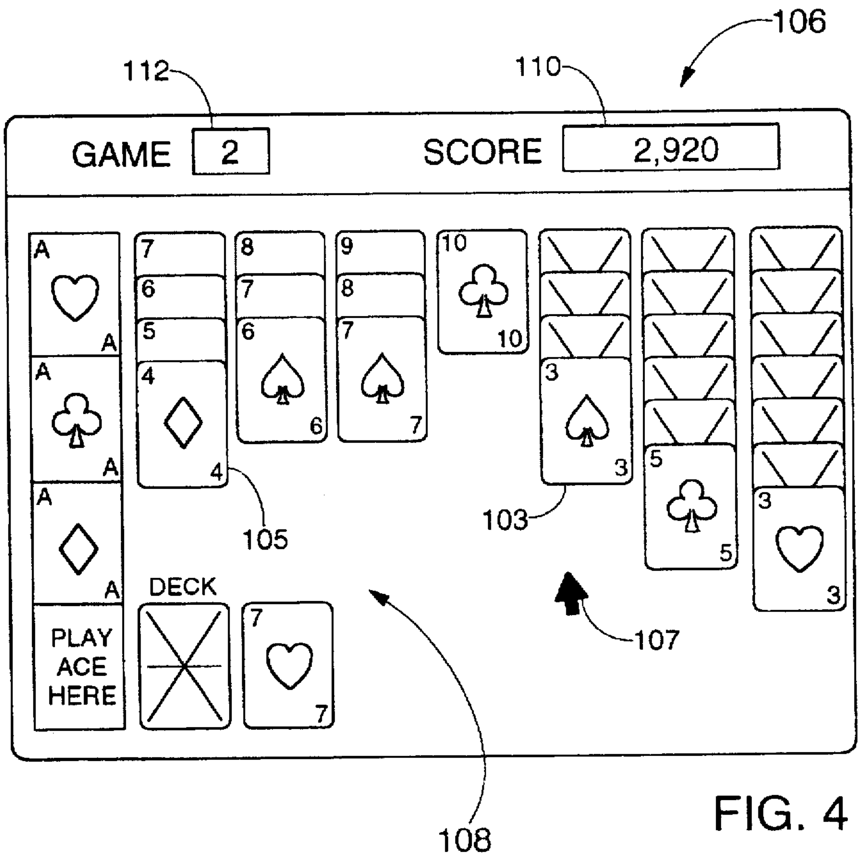
FIG. 4 shows the display screen of the game of FIG. 3 during the course of play.

FIG. 4 shows a tournament game in progress on screen 106. Cursor 107 is used, by means of controller 38 (FIG. 1) to select and move cards 108 in the field of play. Game number display 112 shows that the game in progress is the second game of a tournament set and score display 110 indicates an accumulated tournament score of 2,920 points. The time required to recognize and effect a move, such as three of spades 103 to four of diamonds 105, is scored as an inverse function, so that faster play is rewarded with a higher score. Fast play bonus points may be scored on the basis of time elapsed at each play, or on the basis of elapsed time for each game, or for the entire tournament set.

Figure 5:
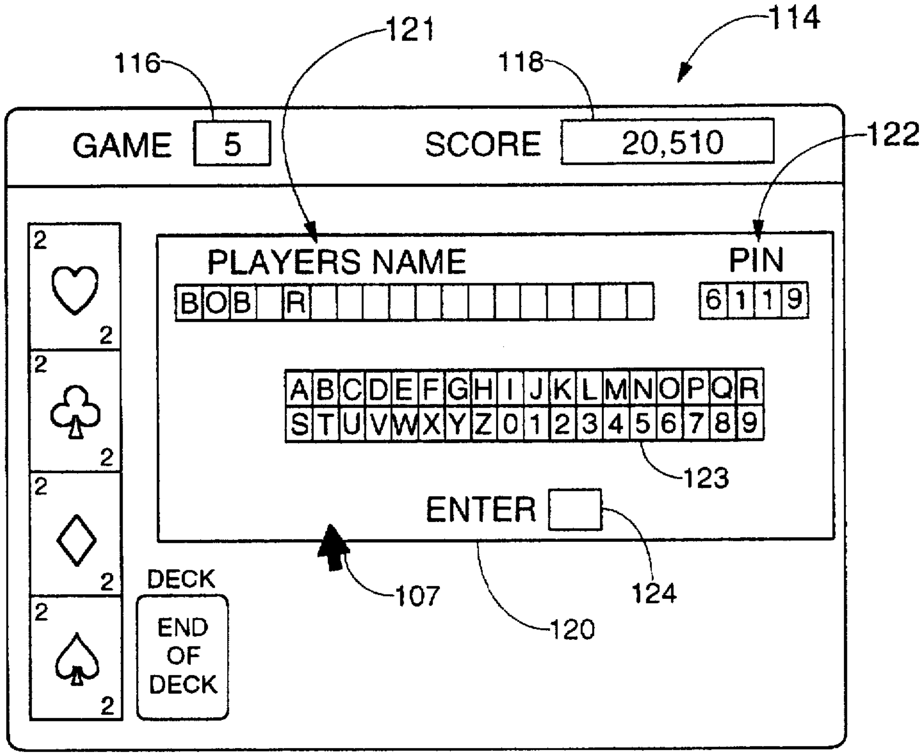
FIG. 5 shows the display screen of FIG. 3 for entering a player's name in the list of top scores.

FIG. 5 shows the completion of a high scoring tournament set on screen 114. The cards have been played and game number display 116 shows that it is the fifth game in the tournament set. Score display 118 indicates an accumulated tournament score of 20,510 points. Inasmuch as this is a top three ranking score, alphanumeric form 120 is displayed for entry of Player's Name 121 and PIN 122. In this example, PLAYER'S NAME 121 is JIM B. and his PIN 122 is 6119, the letters and numbers having been selected and moved from matrix 123 using cursor 107. The player moves cursor 107 to "ENTER" box 124 and signal completion by "clicking" switch 44 (FIG. 1).

Figure 6:
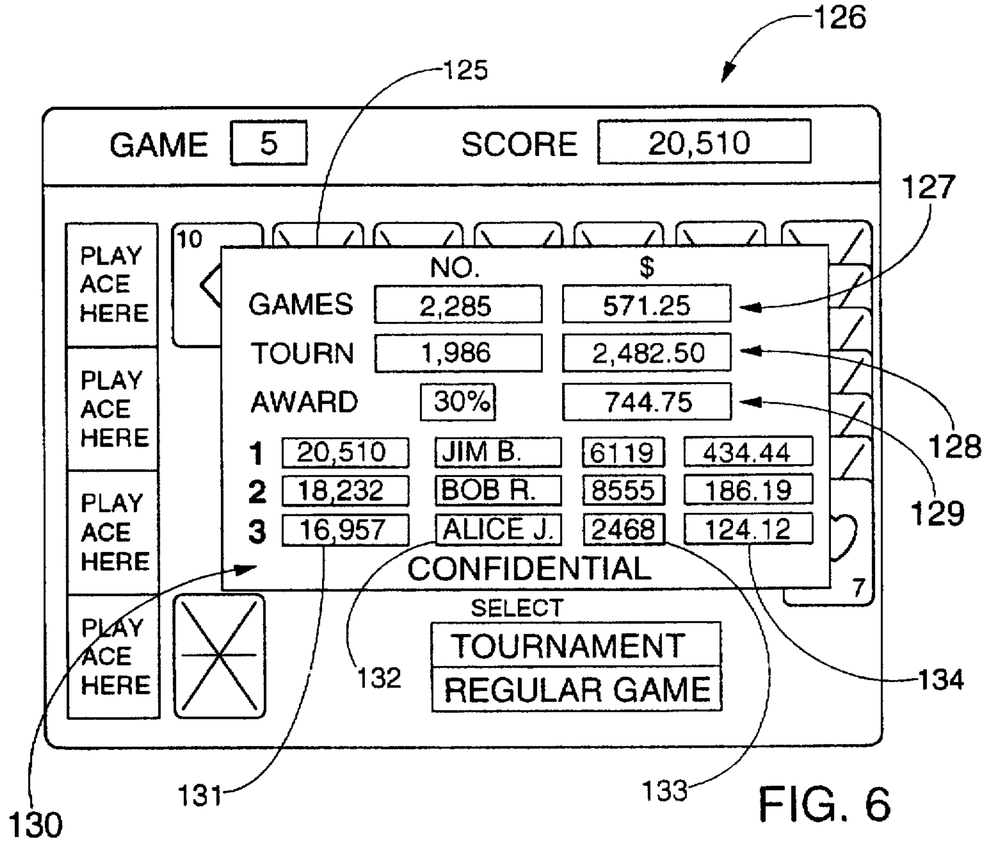
FIG. 6 shows the display screen as it appears when accessed for playing records and revenue information.

FIG. 6 shows the confidential records display 125 on screen 126. Records display 125 is accessible only from inside of the case of the video game machine, and then by secured or unobvious means, so that the information is protected. The information seen here is, Games, Number & Revenue 127; Tournaments, Number & Revenue 128; Award accumulation 129 (@30% rate); and Tournament Leaders 130, with scores 131, names 132, P.I.Ns. 133 and award distribution 134. While top scores and player's names are displayed externally, records display 125 is the only point of access to PIN information.

Some games, such as one-hand, draw poker, will always be purely games of chance, where the luck of the draw is all that matters. In other games, such as the solitaire game of FIGS. 3–6, skill is a factor, especially when playing time bonuses contribute to the score. The very nature of tournament play diminishes the influence of luck as a deciding factor by broadening the statistical base so that, so long as some degree of skill is involved in achieving good game scores, the better players will tend to win. Tournament play can be conducted either under random or identical conditions. Under random conditions, luck my influence the outcome of play because of the limited number of games. Although only a few games can be scored in tournament play, standardization of all game influencing conditions serves to remove the element of chance.

Depending upon the nature of a given game, luck, skill or both my be factors in scoring. A pure game of chance, having no skill factor, becomes a "non-game" when game influencing conditions are made identical because, in the absence of chance, outcomes are also identical. (ie. the abovementioned draw poker game if played with identical card deck sequences) However, any individually played "game of chance", which embodies an element of skill, becomes a pure test of player skill in tournament play under identical, standardized conditions. An example of standardized conditions for the solitaire game of FIGS. 3–6 would be an identical series of card deck sequences for every tournament player. Standardization is inherent in games such as checkers or chess, where play is against the same machine program for all players. Action games like computerized golf incorporate variables for realistic simulation of actual play. Tournament play of such games becomes a pure test of skill when all such variables are identical, ie. when play takes place on the same golf course with the same conditions of wind and turf etc, for each player.

It is to be understood that the present invention is not limited to the disclosed embodiments but, within the spirit of the invention, may also be expressed in other embodiments through rearrangement, modification or substitution of parts or steps.

We claim:

1. A computer controlled method for conducting a solitaire tournament among a plurality of players of a solitaire card game comprising the steps of:

providing a coin operated video solitaire card game including a series of card plays to be made from at least one deck of cards arranged in the same card order for each player of said plurality of players, so that the potential number of card plays in said solitaire card game is the same for each said player thereof;

receiving credits so as to allow play of said solitaire card game;

allocating a portion of the credits received to a tournament award fund by means of computer;

playing said solitaire card game to completion by each said player of said plurality of players, while counting the number of card plays made by each said player and the time required by each said player for completion of said game;

awarding a numerical score to each said player proportional to the number of card plays made thereby in playing said game;

adding an additional score, inversely proportional to the time required by each said player for completion of said game, to said numerical score, so as to provide the total numerical score for each player of said plurality of players;

storing said total numerical score made by each player of said plurality of players in said solitaire tournament in computer memory; and comparing all said total numerical scores, by means of computer to determine the highest said total numerical score for a game in said solitaire tournament.

2. The method according to claim 1 and further comprising the steps of:

displaying said highest said total numerical score so determined; and after each said player of said plurality of players has played said solitaire card game, awarding said tournament award fund to said player with said highest said total numerical score.

3. Apparatus for conducting a solitaire tournament among a plurality of players of a solitaire card game comprising:

a coin operated video solitaire card game including at least one deck of cards arranged in the same predetermined card order for each player of said plurality of players, so that the potential number of card plays in said solitaire card game is the same for each said player thereof;

means for receiving credits so as to allow play of said solitaire card game;

means for allocating a portion of the credits received to a tournament award fund;

means for counting the number of card plays made by each said player and the time required by each said player for completion of said game;

means for awarding a numerical score to each said player proportional to the number of card plays made thereby;

means for adding an additional score, inversely proportional to the time required by each said player for completion of said game, to provide a total numerical score of each said player;

means for storing said total numerical score of each said player of said plurality of players; and means for comparing all said total numerical scores to determine the highest said total numerical score for a game in said solitaire tournament.

4. Apparatus according to claim 3 and further comprising:

means for displaying said highest said total numerical score so determineded; and means for awarding said tournament award fund to the player having said highest said total numerical score.

5. Apparatus for conducting a game playing tournament among a plurality of players according to claim 3 wherein the means for allocation of a portion of the credits received are capable of being altered so as to adjust the allocated portion as a percentage of the credits received.

6. Apparatus for conducting a game playing tournament among a plurality of players according to claim 3 wherein said means for comparing all said total numerical scores further comprises:

means for also determining the second highest said total numerical score for a game in said solitaire tournament; and means for displaying said highest and said second highest said total numerical scores.

7. Apparatus for conducting a game playing tournament among a plurality of players according to claim 6 and further comprising:

means for identifying the players by name; and means for displaying the names of said players having said highest and said second highest said total numerical scores.

* * * * *